(12) United States Patent
Saastamoinen

(10) Patent No.: US 8,285,227 B2
(45) Date of Patent: Oct. 9, 2012

(54) COMMUNICATION BETWEEN TRANSMITTER AND RECEIVER

(75) Inventor: Jouni Saastamoinen, Coppell, TX (US)

(73) Assignee: Elektrobit System Test Oy, Oulunsalo (FI)

(*) Notice: Subject to any disclaimer, the term of this patent is extended or adjusted under 35 U.S.C. 154(b) by 650 days.

(21) Appl. No.: 12/347,281

(22) Filed: Dec. 31, 2008

(65) Prior Publication Data

US 2010/0167640 A1   Jul. 1, 2010

(51) Int. Cl.
*H04B 1/04* (2006.01)

(52) U.S. Cl. .................................... 455/114.2
(58) Field of Classification Search ............... 455/114.2
See application file for complete search history.

(56) References Cited

U.S. PATENT DOCUMENTS

| | | | |
|---|---|---|---|
| 4,644,526 A | | 2/1987 | Wu |
| 5,103,474 A | * | 4/1992 | Stoodley et al. ............ 455/403 |
| 7,693,082 B2 | * | 4/2010 | Wright ...................... 370/246 |
| 2005/0085267 A1 | * | 4/2005 | Lemson et al. ............ 455/562.1 |
| 2005/0232216 A1 | | 10/2005 | Webster et al. |
| 2008/0280569 A1 | | 11/2008 | Hazani et al. |

FOREIGN PATENT DOCUMENTS

| | | |
|---|---|---|
| EP | 1821428 A1 | 8/2007 |
| JP | 4123537 A | 4/1992 |
| JP | 08340574 | 12/1996 |
| WO | WO02069531 A1 | 9/2002 |

OTHER PUBLICATIONS

International Search Report for corresponding PCT Application No. PCT/FI2009/050978; Mar. 23, 2010; pp. 1-5; Helsinki, Finland.

* cited by examiner

*Primary Examiner* — Lincoln Donovan
*Assistant Examiner* — Daniel Rojas
(74) *Attorney, Agent, or Firm* — Hoffmann & Baron, LLP

(57) ABSTRACT

A frequency manipulator comprises a frequency transformer and a frequency retransformer. The frequency transformer receives each of at least one signal in a known band from at least one transmitter, transforms the known band of each signal into a predetermined band and forwards each signal in the predetermined band to a channel device. The frequency retransformer receives each signal from the channel device, retransforms the predetermined band of each signal to the known band and forwards each signal in the known band to at least one receiver.

14 Claims, 3 Drawing Sheets

COMMUNICATION BETWEEN TRANSMITTER AND RECEIVER

BACKGROUND

1. Field

The invention relates to communication between a transmitter and a receiver.

2. Description of the Related Art

An electronic communication system often has a module which limits the bandwidth of the system. For example, an FDD (Frequency Division Duplex) system, where a bandwidth covering a band between uplink and downlink transmissions may be tens or hundreds of megahertz, requires at least two radio channels in a radio channel emulator since the bandwidth of one channel in the radio channel emulator is not broad enough to include both uplink and downlink. Correspondingly, a TDD (Time Division Duplex) system also requires two radio channels in the radio channel emulator since the channel of uplink may be different from that of downlink.

Such an excessive use of radio channels of the radio channel emulator leads to waste of resources, a complicated system and potentially to a situation where the number of required radio channels is higher than the number of available radio channels in the radio channel emulator. A plurality of communication systems have similar problems due to the bandwidth as a bottleneck. Hence, there is a need for a better system.

SUMMARY

An object of the invention is to provide an improved communication. According to an aspect of the invention, there is provided a communication method, the method comprising transforming a known band of at least one signal to a predetermined band of a channel device between transmission and reception; feeding the at least one signal in the predetermined band through the channel device; and retransforming, after the channel device, the predetermined band of the at least one signal to the known band for reception.

According to another aspect of the invention, there is provided a communication system, the system comprising at least one communication device, a frequency transformer, a channel device and a frequency retransformer; at least one communication device being configured to transmit at least one frequency in a known band; the frequency transformer being configured to transform the known band into the predetermined band and feed the predetermined band to the channel device; the channel device being configured to receive and output in the predetermined band, the channel device residing between each transmitting communication device and each receiving communication device; the frequency retransformer being configured to retransform the predetermined band output by the channel device to the known band; and the at least one receiving communication device being configured to receive the at least one frequency in the known band.

According to another aspect of the invention, there is provided a channel system comprising a frequency transformer, a channel device, a frequency retransformer; the frequency transformer being configured to receive each of at least one signal in a known band from at least one transmitter and transform the known band of each signal into a predetermined band; the channel device between the at least one transmitter and at least one receiver being configured to receive and output each signal in the predetermined band; and the frequency retransformer being configured to receive each signal in the predetermined band, retransform the predetermined band of each signal to the known band and forward each signal in the known band to the at least one receiver.

According to another aspect of the invention, there is provided a frequency manipulator comprising a frequency transformer and a frequency retransformer; the frequency transformer being configured to receive each of at least one signal in a known band from at least one transmitter, transform the known band of each signal into a predetermined band and forward each signal in the predetermined band to a channel device; and the frequency retransformer being configured to receive each signal from the channel device, retransform the predetermined band of each signal to the known band and forward each signal in the known band to at least one receiver.

The invention enables a shift of frequencies of signals to a suitable band for the channel device.

BRIEF DESCRIPTION OF THE DRAWINGS

In the following, the invention will be described in greater detail with reference to the embodiments and the accompanying drawings, in which.

DETAILED DESCRIPTION

The following embodiments may be associated with radio frequency signals in various radio systems. The applications include, for example, 3GPP (Third Generation Partnership Project) LTE (Long Term Evolution). It may also be applied with different physical layer multiple access techniques such as CDMA (Code Division Multiple Access), WCDMA (Wide-band CDMA), FDMA (Frequency Division Multiple Access), TDMA (Time Division Multiple Access), OFDMA (Orthogonal Frequency Division Multiple Access), WiMAX (Worldwide Interoperability for Microwave Access).

Figure 1:
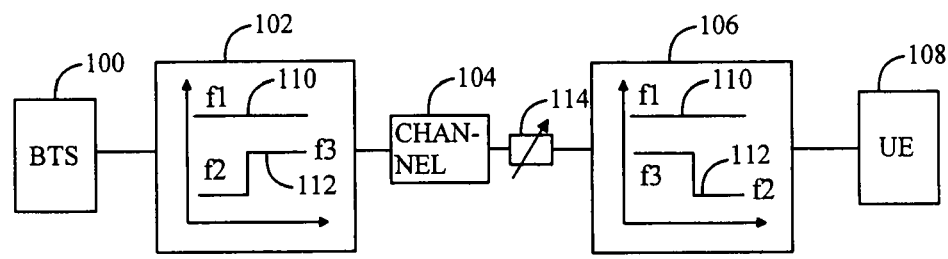
FIG. 1 shows a communication system.

With reference to FIG. 1, examine first an example of a communication system where a transmitter 100 transmits at least one signal at two frequencies to a receiver 108. The communication system otherwise comprises a frequency transformer 102, a channel device 104 and a frequency retransformer 106. In general, there may be more than one transmitter coupled to the frequency transformer 102 and more than one receiver coupled to the frequency retransformer 106 for communicating through the channel device 104. The transmitter 100 may be a base station of a radio system and the receiver 108 may be a user terminal of a radio system. In an opposite case, the receiver 108 may be a base station and the transmitter 100 may be a user terminal.

The transmitter 100 (or the transmitters) may transmit at least one signal in a known band. In this example, the transmitter 100 transmits two separate signals 110, 112 at different carrier frequencies f1, f2. The known band may include the frequencies from the first carrier frequency f1 continuing up to the last carrier frequency f2. In general, the number of frequencies may be more than two.

The frequency transformer 102 transforms the known band into the predetermined band. The transformation of the known band comprises shifting frequencies of the at least one signal. In this example, the signal 112 at the frequency f2 may be moved to a frequency f3, where f1>f3>f2 or f1<f3<f2 and in either case |f1−f3|<|f1−f2|. Hence, the predetermined band is narrower than the known band. The predetermined band may be a characteristic band of the channel device 104. It can be considered that the channel device 104 does not operate properly outside of the predetermined band.

In general, the channel device 104 may reside between a transmitter and a receiver with respect to a signal propagating therebetween. When the system has a plurality of transmitters and receivers, the channel device 104 may be between the at least one transmitter and the at least one receiver. In this example, the channel device 104 resides between the transmitter 100 and the receiver 108. The channel device 104 receives and outputs each signal in the predetermined band.

The frequency retransformer 106 receives each signal output by means of the channel device 104 and retransforms the predetermined band to the known band. In this example, the signal 112 at the frequency f3 is shifted back to the frequency f2. In general, all the frequencies are shifted back.

The receiver 108 receives the at least one signal in the known band. In general, each of the at least one receiver receives the at least one signal in the known band.

Figure 2:
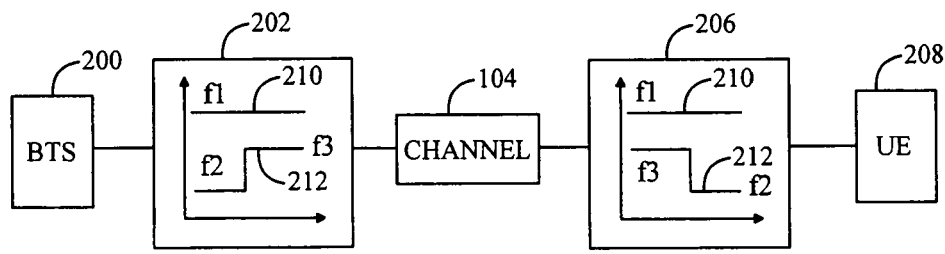
FIG. 2 illustrates transceivers transmitting to each other at different frequencies.

FIG. 2 presents an embodiment where a first transceiver 200 may transmit a signal at a frequency f1 and receive a signal at a frequency f2, and a second transceiver 208 may transmit a signal at the frequency f2 and receive a signal at the frequency f1. The number of frequencies may also be higher. This sort of communication takes place in an FDD system. In this example, the first frequency transformer 202 does not shift the frequency f1 of the signal 210 transmitted by the first transceiver 100. However, the frequency transformer 202 shifts the signal 212 at a frequency f3 propagating from the channel device 104 to the first transceiver 100 to the frequency f2, where f1>f3>f2 or f1<f3<f2 and in either case |f1−f3|<|f1−f2|. Hence, the first frequency transformer 202 acts like a frequency transformer 102 in the direction from the first transceiver 200 to the channel device 104 by transforming the known band (between the frequencies f1 and f2) into the predetermined band (between the frequencies f1 and f3). Similarly, the first frequency transformer 202 acts like a frequency retransformer 106 in the direction from the channel device 104 to the first transceiver 200 by transforming the predetermined band to the known band.

The channel device 104 receives a signal at the frequency f1 propagating from the first transceiver 200 to the second transceiver 208.

The second frequency transformer 206 receives the signal at the frequency f1 from the channel device 104 and the second frequency transformer 206 may output the signal at the same frequency f1. The second frequency transformer 206 shifts the signal at the frequency f2 to the frequency f3. Hence, the second frequency transformer 206 acts like a frequency retransformer 106 in the direction from the channel device 104 to the first transceiver 200 by transforming the predetermined band into the known band. Similarly, the second frequency transformer 206 acts like a frequency transformer 102 in the direction from the first transceiver 200 to the channel device 104 by transforming the known band into the predetermined band.

The channel device 104 receives a signal shifted from f2 to f3 from the second frequency transformer 206. Because of the frequency shifts in the first and second transformers 202, 206, the channel device 104 receives and outputs each signal in the predetermined band.

In FIGS. 1 and 2, the channel device 104 may be, for example, a radio channel emulator, a repeater, a wired telephone line or the like. The channel device 104 may have different responses at different frequencies. The transmitter 100, receiver 108, transceiver 200 and 208 are communication devices in a communication system.

Figure 3:
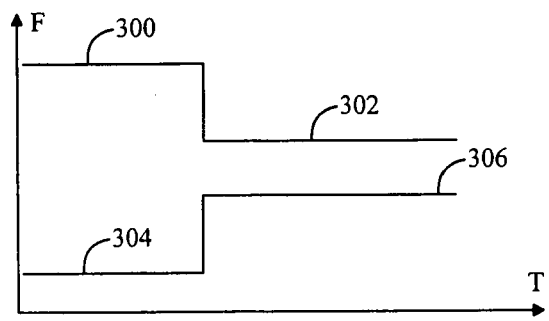
FIG. 3 illustrates a shift of two frequencies closer to each other.

FIG. 3 illustrates the shift of two frequencies closer to each other. The vertical axis is frequency and the horizontal axis is time, both on an arbitrary scale. Differing slightly from what is presented in FIGS. 1 and 2, both frequencies are shifted. A frequency (f10) 300 may be shifted to a frequency (f11) 302 and a frequency (f13) 304 may be shifted to a frequency (f12) 306. The relation of frequencies may be such that f13<f12<f11<f10. It is also possible to shift the frequencies so that the relation f13<f11<f12<f10 is obtained.

Figure 4:
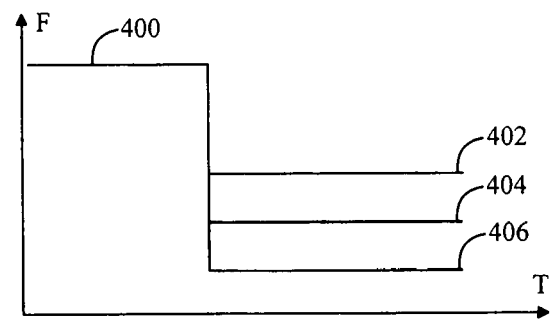
FIG. 4 illustrates a separation of signals at a common frequency.

FIG. 4 presents frequency separation from one frequency. Instead of bringing separate frequencies closer to each other, the frequency transformer 102 may separate a common frequency 400 into N different frequencies 402 to 406 in the predetermined band such that each signal has its unique frequency. These separate frequencies may then be fed to a channel device 104.

In a TDD system communication between the parties takes place at a common frequency. By separating the downlink communication and the uplink communication into different frequencies it is, for example, possible to use one radio channel for both directions in emulation, since different frequencies may have different channel properties in a channel emulator.

Figure 5:
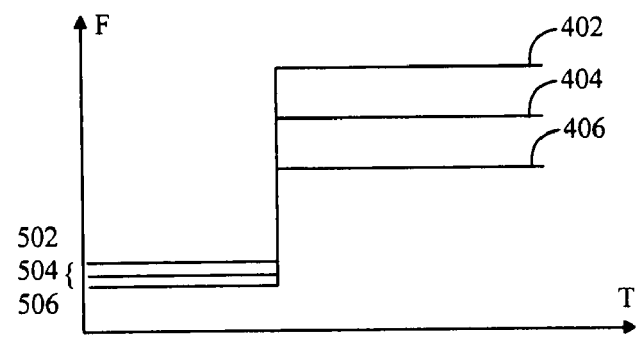
FIG. 5 illustrates widening of frequency separation.

FIG. 5 shows an embodiment where an existing frequency separation is widened. A number of N close frequencies 502-506 may be separated into distinctly different frequencies 402-406 in a frequency transformer 102 such that each signal has a unique frequency. The spacing between two successive frequencies may be ΔHz (in average), and after the frequency transformer 106 the spacing may be 10 ΔHz, for example. These distinctly separate frequencies may then be fed to a channel device 104. By separating the frequencies further from each other it is, for example, possible to use one radio channel of a channel emulator for all frequencies, since a sufficiently wide difference between frequencies may enable different channel properties in a channel emulator.

A frequency retransformer 106 may return the separated frequencies 402-406 to the same frequency 400 or to the original frequencies 502-506 close to each other after they have passed through the channel device 104.

Additionally, the communication system may comprise a second attenuator 114, which may attenuate each signal according to a path loss in the channel device 104.

A channel emulator may be used to simulate or emulate a radio channel between a transmitter and a receiver. With a device simulating a radio channel, it is possible to very freely simulate a desired type of radio channel. In a digital radio-channel simulator, the channel is usually modelled with a FIR (Finite Impulse Response) filter that forms a convolution between the channel model and the input signal in such a manner that the signal that is delayed by different delays is weighted by channel coefficients, i.e. tap coefficients, and the weighted signal components are summed. The channel coefficients of the model are altered to correspond to the behavior of an actual channel. The model may be artificially generated or it may be based on a measurement in a desired environment.

A repeater regenerates a signal. A radio repeater receives and retransmits a radio frequency signal. A repeater does not detect the transmitted data but may change power and timing of the signal. For example, a repeater may reside on top of a mountain, where it may receive signals from one side of the mountain and it may retransmit the signal to the other side of the mountain thereby enabling a connection between the sides over the mountain.

A telephone line may be any kind of wire used to transfer a narrow band of frequencies. A usual telephone line only transfers a band of acoustic frequencies. However, some other frequency band may be shifted to the operable band of the telephone line which corresponds to the transformation of a known band to a predetermined band (of the telephone line). Hence, instead of radio frequencies acoustic frequencies may be used in an embodiment.

In general, the frequency transformer 104 may receive at least two frequencies of the at least one signal in the known band broader than the predetermined band, and the frequency transformer 104 may shift at least one frequency outside the predetermined band into the predetermined band. The frequency retransformer 106 may return the shifted at least one frequency into the known band. The at least one frequency may be placed outside the predetermined band.

The transmitter 100 (or transmitters) may transmit at least two frequencies of the at least one signal in the known band narrower than the predetermined band. The frequency transformer 102 may increase the spacing of the at least two frequencies for occupying a band as broad as the predetermined band at the maximum. The frequency retransformer 106 may decrease the spacing of the at least two frequencies to the known band.

Figure 6:
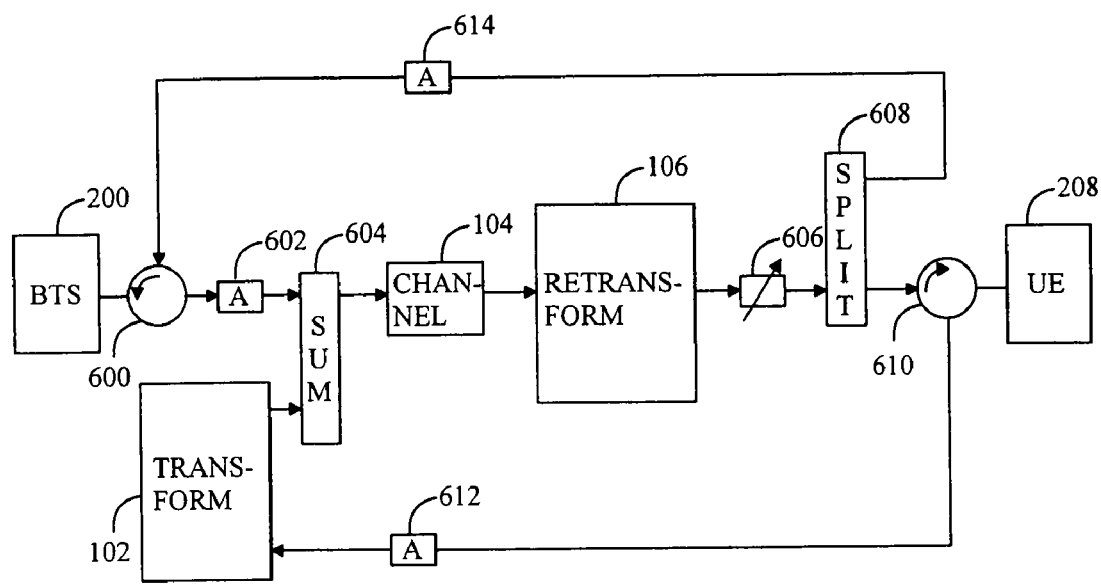
FIG. 6 illustrates separation of input and output of a channel device in a communication system.

FIG. 6 presents an embodiment which is suitable for a FDD duplex distance compressor-expander, for example. A first transceiver 200, which may be a base station of a radio system, may transmit a signal which propagates to a first circulator 600. The first circulator 500 may feed the signal to an attenuator 602 which may attenuate the signal by AdB. The transmission power of the first transceiver may be too high to be input directly to any device. For example, a base station may transmit at 10 W (i.e. +40 dBm). Hence, the attenuator 602 may have 40 dB attenuation to achieve 0 dBm level. The attenuated signal may be input to a combiner 604 which combines the signal originating from the first transceiver 200 and a signal originating from a second transceiver 206 to the same line. The combiner 604 may be an RF (Radio Frequency) summing element. The combined signals may then enter a channel device 104. After the channel device, the combined signals may propagate to a frequency retransformer 106 which changes the duplex distance of the signals originating from different transceivers. This means that the frequency distribution may be returned. After the frequency retransformer 106 the signals may enter a path loss attenuator 606 which may attenuate the signals in a desired manner. The path loss attenuator 606 is similar to the path loss attenuator 114. Then the signals may enter a divider 608 which divides one part of the signals to a second circulator 610 and another part towards the first transceiver 200. The divider 608 may be an RF splitting element. When the signals enter the circulator 610, the circulator 610 forwards the signals to the second transceiver 206 which is configured to receive the signal transmitted by the first transceiver 200. The second transceiver 200 may be a user terminal of a radio system.

When the second transceiver 200 transmits a signal, the signal propagates to the second circulator 610 which forwards the signal to an attenuator 612 attenuating the signal by B dB. The attenuator 612 scales the transmission power of the second transceiver 200 to the same level with the first transceiver 200 after the attenuator 602. Since the second transceiver may be a user terminal its transmission power may be 1 W to 2 W (i.e. +30 dBm). Hence, the attenuation of the attenuator 612 may be about 30 dB. After the feasible attenuation, the signal propagates to the frequency transformer 102, which transforms the known band to the predetermined band. In this example, the frequency f2 of the signal transmitted by the second transceiver 206 is shifted closer to the frequency f1 of the signal transmitted by the first transceiver 200 in order to move the frequency f2 to the predetermined band. In this example, the frequency f1 is considered to be in the predetermined band. After the shift, the signal transmitted by the second transceiver 206 and the signal transmitted by the first transceiver 200 are combined to the same line in the combiner 604. When the combination of signals has propagated through the channel device 104, the frequency retransformer 106 shifts the frequencies of the signals such that the signal at the frequency f2 is shifted to the frequency f3. The signal at the frequency f1 is not shifted in this example. When the signals pass through the path loss attenuator 606, the signals enter the divider 608 which feeds a part of the signals to a potential attenuator 614 having an attenuation (A−B)dB. Taking into account the attenuation in the attenuator 612, this results in an attenuation of AdB altogether. The total attenuation thus becomes the same in both directions. The signals may further propagate to the first circulator 600, which forwards the signals to the first transceiver 200. The first transceiver 200 is configured to receive the signal transmitted by the second transceiver 206.

Each circulator 600, 610 is operably coupled to a communication device 200, 206, an input of the channel device 104 and an output of the channel device 104. Each circulator 600, 610 isolates the input and the output of the channel device 104.

If both f1 and f2 need to be shifted, the frequency transformer 102 should be placed between the combiner 604 and the channel device 104.

A frequency transformer 102 may comprise a mixer and a filter for shifting each frequency or the known band to the predetermined band. In a mixer, a signal at a certain frequency or a band f is multiplied by a signal at a frequency $f_o$ of a local oscillator. The multiplied signals form signals at frequencies $f+f_o$ and $f-f_o$, either of which may be filtered away depending on whether the frequency f is shifted up or down. Instead of a mixer, a controllable non-linear electronic component or circuit may be used.

All in all, to avoid the problems associated with the bandwidth of the channel device 104 a frequency manipulator comprising a frequency transformer 102 and a frequency retransformer 106 may be used. To emulate radio channels a channel system comprising a frequency transformer 102, a channel device 104 and a frequency retransformer 106 may be used.

Figure 7:
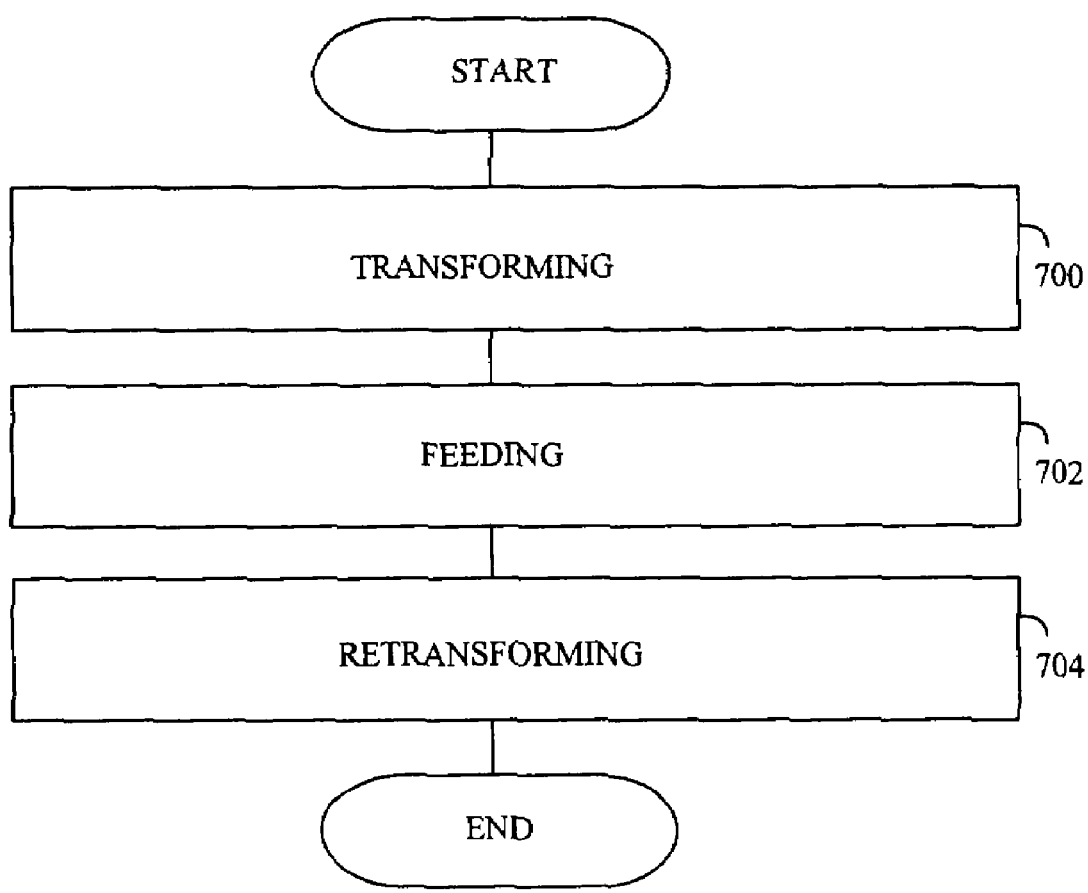
FIG. 7 illustrates a flow chart of a method.

FIG. 7 presents a flow chart of the method. In step 700 the known band of the at least one signal is transformed to a predetermined band of a channel device between transmission and reception. In step 702, the at least one signal in the predetermined band is fed through the channel device. In step 704, the predetermined band of the at least one signal is retransformed to the known band after the channel device for reception.

Even though the invention has been described above with reference to an example according to the accompanying drawings, it is clear that the invention is not restricted thereto but it can be modified in several ways within the scope of the appended claims.

The invention claimed is:

1. A communication method, the method comprising:
transforming more than one signal frequency of a plurality of signal frequencies in a known band to different signal frequencies in a predetermined band of a channel device different from the known band between transmission and reception such that frequency separation between the more than one signal frequency in the known band is different from frequency separation between the different signal frequencies in the predetermined band, the known band being different from the predetermined band;
feeding the plurality of signal frequencies in the predetermined band through the channel device; and
retransforming, after the channel device; the more than one signal frequency in the predetermined band to the known band for reception.

2. The method of claim 1, the method further comprising:
transmitting the at least one signal using at least two frequencies in the known band broader than the predetermined band;
shifting each signal frequency outside the predetermined band into the predetermined band before the channel device; and
returning each shifted frequency from the predetermined band to the known band after the channel device.

3. The method of claim 1, the method further comprising:
transmitting the at least one signal using at least two frequencies in the known band narrower than the predetermined band;
separating at least one frequency from at least one other frequency for occupying at least partly the predetermined band before the channel device; and
returning the at least one separated frequency back from outside the known band to the known band after the channel device.

4. A communication system, the system comprising:
at least one communication device;
a frequency transformer;
a channel device; and
a frequency retransformer, the at least one communication device being configured to transmit a plurality of signal frequencies in a known band, the frequency transformer being configured to transform more than one signal frequency in the known band to different signal frequencies in the predetermined band of the channel device such that frequency separation between the more than one signal frequency in the known band is different from frequency separation between the different signal frequencies in the predetermined band, the known band being different from the predetermined band, and feed the signal frequencies in the predetermined band to the channel device, the channel device being configured to receive and output in the predetermined band, the channel device residing between each transmitting communication device and each receiving communication device, the frequency retransformer being configured to retransform the more than one signal frequency in the predetermined band received from the channel device to different signal frequencies in the known band, and the at least one receiving communication device being configured to receive the plurality of signal frequencies in the known band.

5. The communication system of claim 4, wherein the frequency transformer is configured to receive at least two frequencies of at least one signal in the known band broader than the predetermined band, the first frequency transformer being configured to shift at least one frequency outside the predetermined band into the predetermined band, the frequency retransformer being configured to return the shifted at least one frequency into the known band outside the predetermined band.

6. The communication system of claim 4, wherein the at least one communication device is configured to transmit at least two frequencies of at least one signal in the known band narrower than the predetermined band, the frequency transformer being configured to increase the spacing of at least two frequencies for occupying a band as broad as the predetermined band at the maximum, the frequency retransformer being configured to decrease the spacing of the at least two frequencies in the known band.

7. The communication system of claim 4, wherein the communication system further comprises:
a circulator for each communication device;
a combiner; and
a divider, each circulator being operably coupled to a communication device, an input of the channel device and an output of the channel device, each circulator being configured to isolate the input and the output of the channel device, the combiner being configured to combine the frequencies from at least two transmitting communication devices, the divider being configured to divide the frequencies for at least two receiving communication devices.

8. A channel system comprising:
a frequency transformer;
a channel device; and
a frequency retransformer, the frequency transformer being configured to receive each of a plurality of signal frequencies in a known band from at least one transmitter and transform more than one signal frequency in the known band into different signal frequencies in a predetermined band of a channel device such that frequency separation between the more than one signal frequency in the known band is different from frequency separation between the different signal frequencies in the predetermined band, the known band being different from the predetermined band, the channel device between the at least one transmitter and at least one receiver being configured to receive and output each signal in the predetermined band, the frequency retransformer being configured to receive each signal frequency in the predetermined band, retransform the more than one signal frequency in the predetermined band to the known band and forward each signal frequency in the known band to the at least one receiver.

9. The channel system of claim 8, wherein the channel device is a channel emulator.

10. The channel system of claim 8, wherein the channel device is a repeater.

11. The channel system of claim 8, wherein the channel device is a wired telephone line.

12. A frequency manipulator comprising:
a frequency transformer; and
a frequency retransformer, the frequency transformer being configured to receive each of a plurality of signal frequencies in a known band from at least one transmitter, transform more than one signal frequency in the known band to different signal frequencies in a predetermined band of a channel device such that frequency separation between the more than one signal frequency in the known band is different from frequency separation between the different signal frequencies in the predetermined band, the known band being different from the predetermined band, and forward each signal in the predetermined band to the channel device, the frequency retransformer being configured to receive each signal from the channel device, retransform the more than one signal frequency in predetermined band to different signal frequencies in the known band and forward each signal frequency in the known band to at least one receiver.

13. The frequency manipulator of claim 12, wherein the frequency transformer is configured to receive at least two frequencies of at least one signal in the known band broader than the predetermined band, the frequency transformer being configured to shift at least one frequency outside the predetermined band into the predetermined band, the frequency retransformer being configured to return the shifted at least one frequency into the known band outside the predetermined band.

14. The frequency manipulator of claim 12, wherein the frequency transformer is configured to receive at least two frequencies of at least one signal in the known band narrower than the predetermined band, the frequency transformer being configured to increase the spacing of the at least two frequencies for occupying a band as broad as the predetermined band at the maximum, the frequency retransformer being configured to decrease the spacing of the at least two frequencies in the known band.

* * * * *